C. E. WHITE.
HAY RAKE.
APPLICATION FILED FEB. 27, 1909.
954,903.
Patented Apr. 12, 1910.
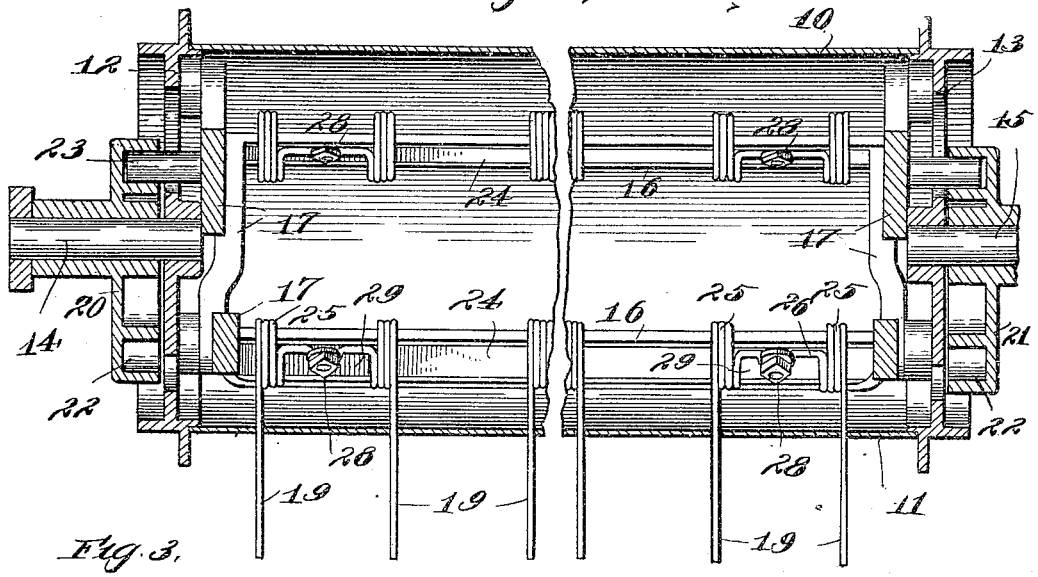
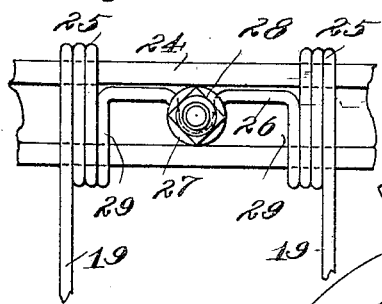
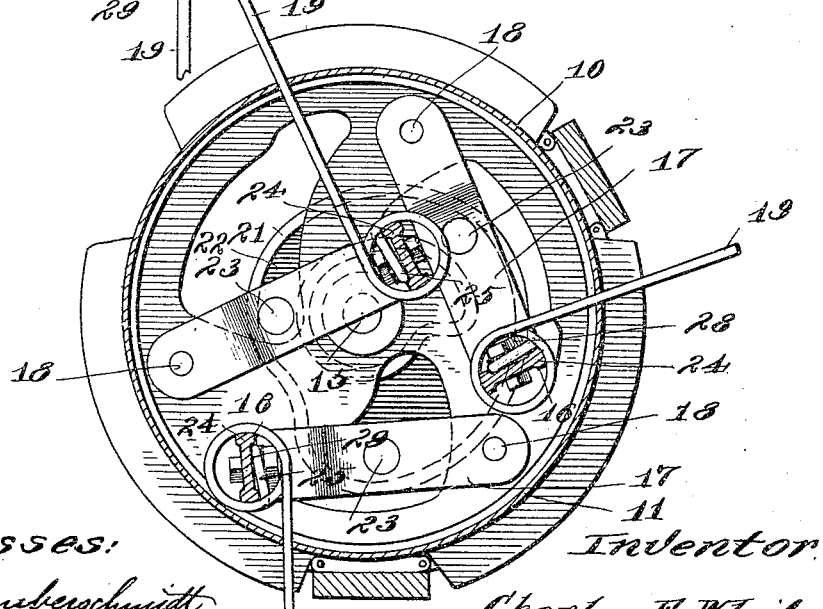
Witnesses:
J. A. Naubenschmidt
E. M. Klatcher
Inventor
Charles E. White
By Gillson & Gillson Attys.

UNITED STATES PATENT OFFICE.

CHARLES E. WHITE, OF MOLINE, ILLINOIS.

HAY-RAKE.

954,903. Specification of Letters Patent. Patented Apr. 12, 1910.

Application filed February 27, 1909. Serial No. 480,298.

*To all whom it may concern:*

Be it known that I, CHARLES E. WHITE, a citizen of the United States, and resident of Moline, county of Rock Island, and State of Illinois, have invented certain new and useful Improvements in Hay-Rakes, of which the following is a specification, and which are illustrated in the accompanying drawings, forming a part thereof.

The invention relates to hay rakes, and more particularly to rake-heads of improved construction adapted for use in hay-gathering machines of various forms.

The invention contemplates a rake tooth formed from wire, a rake-bar, and improved means for connecting the tooth and bar embodying a novel formation of the head of the tooth and of the bar, whereby they are adapted to fit together and be securely but removably united.

The object of the invention is to improve the construction of hay rakes; and the invention is exemplified in the structure to be hereinafter described, and illustrated in the accompanying drawings wherein—

Figure 1 is a longitudinal sectional view of the raking drum of a hay-gathering machine provided with rake-heads embodying the features of the invention; Fig. 2 is a transverse sectional view taken on the line 2—2 of Fig. 1; and Fig. 3 is a detail plan view of one of the rake-heads of the mechanism illustrated in Figs. 1 and 2.

There is illustrated in the drawings a rotatable raking drum, generally designated 10, and adapted for use in such hay-gathering machines as side delivery rakes and hay loaders of well-known types. As shown, this drum has a sheet metal body 11, carried by heads 12 and 13, one at each end, and each of which is mounted for rotation by being carried by a stub-shaft, as 14, 15. Within the drum 10 there are a plurality of rake-heads, generally designated 16, which extend from end to end of the drum and are carried by arms 17, pivotally mounted upon the inner faces of the heads 12, 13, as at 18 (Fig. 2). The teeth, as 19, of the rake-heads 16 are projected through the wall of the drum 10 for gathering hay by the swinging of the arms 17. This swinging of the arms 17 is controlled by cams 20, 21, one of which is mounted upon each of the stub-shafts 14, 15, adjacent the corresponding head 12, 13, of the drum 10, and each of which is provided with a cam groove, as 22, within which travel studs 23, which project through the heads 12, 13, of the drum from the arms 17. Each of the rake-heads 16 comprises a bar 24, carrying a plurality of the rake teeth 19. As shown, the rake teeth 19 are formed of wire, preferably in pairs from a single piece. This wire is wound into a coil 25 surrounding the bar 24 at the base of each tooth, and that part of the wire 26 which connects the pairs of teeth is bent into a loop 27 (Fig. 3), intermediate its ends for receiving an attaching bolt 28 which passes through the loop into the bar 24. Preferably the bar 24 is provided with a socket 29 for receiving the loop 27 and adjacent portions 26 of the wire from which the pairs of teeth 19 are formed. As shown, this socket 29 takes the form of a longitudinal channel extending from end to end of the bar 24, and that part of the wire from which the pairs of teeth are formed, including the connecting section 26 and the loop 27, constitutes a structure adapted to snugly fit this channel.

The construction provides a rake bar upon which any number of teeth may be secured at intervals throughout its length, while the rake-teeth themselves are of simple and durable construction, and they are firmly attached to the rake-bar. The coils of wire 25 at the base of each tooth provide a proper resilience for the teeth, and as they surround the bar 24 they permit a yielding of the teeth but prevent their permanent distortion.

I claim as my invention—

1. In a raking device, in combination, a head formed from a bar having a longitudinal channel in its face, a pair of teeth mounted on the head and being formed from a single piece of wire coiled around the head at the base of each tooth, the two coils being spaced apart and the intervening portion of the wire being straight adjacent its ends and bent to a loop intermediate its ends to provide a structure adapted to snugly fit the channel of the head, and a bolt set into the head and bearing on the loop.

2. In a raking device, in combination, a head formed from a bar having a longitudinal channel in its face, a pair of teeth mounted on the head and being formed from a single piece of wire coiled around the head at the base of each tooth, the two coils being spaced apart and the intervening portion of the wire being bent to form a looped structure adapted to snugly fit the channel of the head, and a bolt set into the head and bearing on the loop.

3. In a rake, in combination, a bar having a socket, a tooth formed of wire, such wire being bent into a coil surrounding the bar at the base of the tooth and into a looped structure constituting a head for the tooth and adapted to snugly fit the socket of the bar beyond the coil from the body of the tooth, and a bolt entering the bar and bearing on the head of the tooth.

4. In a rake, in combination, a bar having a socket, a pair of teeth formed from a single piece of wire, that part of the wire connecting the bodies of the teeth being bent to form a looped structure adapted to snugly fit the socket of the bar, and a bolt entering the bar and bearing on the loop.

CHARLES E. WHITE.

Witnesses:
O. F. LUNDAHL,
R. M. ADAMS.